US008601893B2

(12) United States Patent
Reisch et al.

(10) Patent No.: US 8,601,893 B2
(45) Date of Patent: Dec. 10, 2013

(54) TRANSMISSION DEVICE HAVING AT LEAST ONE SHIFT ELEMENT THAT CAN BE ACTUATED BY MEANS OF AN ACTUATOR

(75) Inventors: Matthias Reisch, Ravensburg (DE); Mark Mohr, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 179 days.

(21) Appl. No.: 13/260,964

(22) PCT Filed: Mar. 30, 2010

(86) PCT No.: PCT/EP2010/054182
§ 371 (c)(1),
(2), (4) Date: Sep. 29, 2011

(87) PCT Pub. No.: WO2010/115772
PCT Pub. Date: Oct. 14, 2010

(65) Prior Publication Data
US 2012/0048049 A1    Mar. 1, 2012

(30) Foreign Application Priority Data
Apr. 7, 2009   (DE) .......................... 10 2009 002 261

(51) Int. Cl.
| F16H 59/00 | (2006.01) |
| F16H 61/00 | (2006.01) |
| F16H 63/00 | (2006.01) |
| F16D 21/00 | (2006.01) |
| F16D 25/00 | (2006.01) |
| F16D 25/10 | (2006.01) |

(52) U.S. Cl.
USPC ....................................... 74/335; 192/48.601

(58) Field of Classification Search
USPC .......... 74/473.1, 473.11, 473.12; 192/48.601, 192/48.611, 48.618, 20, 48.2, 84.6, 30 W; 60/545
See application file for complete search history.

(56) References Cited

U.S. PATENT DOCUMENTS

| 3,478,851 | A  |    | 11/1969 | Smyth et al. |
| 4,798,272 | A  | *  | 1/1989  | Murata et al. ............ 192/70.252 |
| 6,176,808 | B1 | *  | 1/2001  | Brown et al. ...................... 477/5 |
| 7,156,217 | B2 | *  | 1/2007  | Raber .......................... 192/84.6 |
| 7,314,127 | B2 | *  | 1/2008  | Burgman et al. .......... 192/85.24 |
| 7,624,851 | B2 |    | 12/2009 | Seeger et al. |

(Continued)

FOREIGN PATENT DOCUMENTS

| DE |    820 693     | 7/1949  |
| DE | 199 21 064 A1  | 11/2000 |

(Continued)

*Primary Examiner* — David M Fenstermacher
*Assistant Examiner* — Jake Cook
(74) *Attorney, Agent, or Firm* — Davis & Bujold, PLLC; Michael J. Bujold

(57) ABSTRACT

A transmission device (1) including at least one shift element (3, 4) that can be actuated via an actuator (6) having at least one electrical component (5). The electrical component (5) is connected to a transmission shaft (7), rotates during operation at the rotational speed of the transmission shaft (7), and is operatively connected to further components of the transmission device (1), via an electrical transmitting device (8). Electrical energy can be exchanged, at the least, inductively via the transmitting device (8) between the components of the transmission device (1) and the at least one electrical component (5) connected to the transmission shaft (7). Hydraulic actuating pressure can be generated, via the electrical component (5), for actuating the shift element (3, 4).

20 Claims, 2 Drawing Sheets

(56) References Cited

U.S. PATENT DOCUMENTS

| | | |
|---|---|---|
| 8,001,865 B2 | 8/2011 | Muller |
| 2003/0057050 A1 | 3/2003 | Bansbach et al. |
| 2006/0032721 A1* | 2/2006 | Langwald .................. 192/85 C |
| 2006/0213738 A1* | 9/2006 | Moser et al. ................. 192/21.5 |
| 2006/0228236 A1 | 10/2006 | Krisher |
| 2007/0137966 A1* | 6/2007 | Francis et al. ................. 192/20 |
| 2010/0071497 A1 | 3/2010 | Reisch et al. |

FOREIGN PATENT DOCUMENTS

| | | |
|---|---|---|
| DE | 103 37 909 A1 | 4/2005 |
| DE | 103 42 013 A1 | 5/2005 |
| DE | 10 2006 014 866 A1 | 10/2006 |
| DE | 10 2006 009 606 A1 | 9/2007 |
| DE | 10 2006 049 275 A1 | 4/2008 |
| WO | 2005/078303 A1 | 8/2005 |
| WO | 2008/046737 A1 | 4/2008 |

* cited by examiner

TRANSMISSION DEVICE HAVING AT LEAST ONE SHIFT ELEMENT THAT CAN BE ACTUATED BY MEANS OF AN ACTUATOR

This application is a National Stage completion of PCT/EP2010/054182 filed Mar. 30, 2010, which claims priority from German patent application serial no. 10 2009 002 261.9 filed Apr. 7, 2009.

FIELD OF THE INVENTION

The invention relates to a transmission device comprising at least one shift element that can be actuated via an actuator comprising at least one electrical component.

BACKGROUND OF THE INVENTION

Various embodiments for the automatic actuation of friction clutches of transmission devices are known from practical application, which can be subdivided into housing-affixed and rotating transmission components, for instance, in regard to the manner in which energy and information are transmitted. In automatic transmissions, clutches are often actuated mechanically, wherein axial forces are typically transmitted by housing-affixed actuating devices to the rotating clutches via axially displaceable engagement and release bearings.

The disadvantage, however, is that a differential rotational speed is compensated in the region of the bearing and, depending on the axial force that is present, mechanical losses occur that reduce the efficiency of the automatic transmission.

Multi-disk clutches of automatic transmissions are typically actuated to the desired extent using hydraulic actuating devices; for this purpose, hydraulic pressure generated on the housing side is directed via a so-called rotating oil feed to the clutches having rotating hydraulic cylinders.

During operation of such transmission devices, friction occurs in the region of the sealing contact of the rotating oil supply line, which, as drag torque, reduces the efficiency of a transmission device. Moreover, the frictional heat produced in the region of the sealing contact is dissipated via a defined leakage fluid volume flow which cannot be provided without the additional pumping capacity of a hydraulic pump of the transmission device, however. The additional pumping capacity that is required reduces the efficiency of the transmission device, which is undesired.

To reduce the above-described drag torques, electromagnetic actuating devices are assigned to shift elements of transmission devices, in which case a current-carrying coil disposed on the housing side typically moves a concurrently rotating, axially displaceable coupling component to the desired extent.

Electromagnetic actuation of shift elements or clutches are characterized by excessively high current consumption, however, which may place a high load on an electrical system of a vehicle in unfavorable operating states of a vehicle drive train.

In the case of an actuation of shift elements of transmission devices characterized by low current consumption, an electric actuator that rotates concurrently with a transmission shaft, such as a magnet, an electric machine or the like, is supplied with electricity from a housing-affixed current source via slip rings.

The slip rings provided for supplying current require an excessively large amount of construction space, however, and have a short service life due to the sustained frictional load.

DE 10 2006 049 275 A1 makes known a transmission device comprising at least one shift element that can be actuated via an actuator comprising at least one electrical component. The electrical component is connected to a transmission shaft, rotates during operation at the rotational speed of the transmission shaft, and is operatively connected to further components of the transmission device via an electrical transmitting device. Electrical energy and/or data can be exchanged between the housing-affixed components of the transmission device and the at least one electrical component connected to the transmission shaft in a contactless manner via the transmitting device using induction.

However, the actuator has a structurally complex design and requires a large amount of construction space, only limited amounts of which are available in transmission devices.

SUMMARY OF THE INVENTION

The problem addressed by the present invention is therefore that of providing a transmission device in which shift elements can be actuated with high efficiency in a manner that is structurally simple and favorable in terms of construction space.

In the transmission device according to the invention comprising at least one shift element that can be actuated via an actuator comprising at least one electrical component, the electrical component is connected to a transmission shaft, rotates during operation at the rotational speed of the transmission shaft, and is operatively connected to further components of the transmission device via an electrical transmitting device. Electrical energy, at the least, can be exchanged inductively via the transmitting device between the components of the transmission device and the at least one electrical component connected to the transmission shaft, in particular in the direction from a stationary component to a rotating component.

According to the invention, hydraulic actuating pressure for actuating the shift element can be generated via the electrical component. Hydraulic actuation of the shift element makes it possible to design the actuator to be structurally simple and favorable in terms of construction space since a hydraulic transmission path that acts on the shift element with actuating pressure comprises substantially only one hydraulic line which takes up very little construction space and can be designed to extend through existing structural elements of the transmission device.

In a structurally simple and cost-effective development of the transmission device according to the invention, the electrical component comprises an electric machine which drives a pump device and, in a further advantageous embodiment, is interconnected therewith via a transmission device in order to operate the electrical components with low power uptake, in a small amount of construction space, and with a low energy requirement.

An embodiment of the transmission device according to the invention which is also structurally simple and cost effective is designed with a pump device which comprises at least one piston element which is axially displaceable in a piston element chamber and can be actuated by a drive converter device, in the region of which the rotational drive of the electric machine can be converted into translatory drive motion of the piston element, to an extent such that the actuating pressure for the shift element is provided.

An embodiment of the drive converter device that can be manufactured in a cost-effective manner and is favorable in terms of construction space comprises a spindle-nut system.

According to an advantageous embodiment of the transmission device according to the invention, a thermal insulation device is provided at least between the electrical component and the shift element to protect the electrical components of the actuator from a thermal load.

BRIEF DESCRIPTION OF THE DRAWINGS

Further advantages and advantageous developments of the invention will become apparent from the claims and the embodiment, the principle of which is described with reference to the drawings.

They show.

DETAILED DESCRIPTION OF THE PREFERRED EMBODIMENTS

Figure 1:
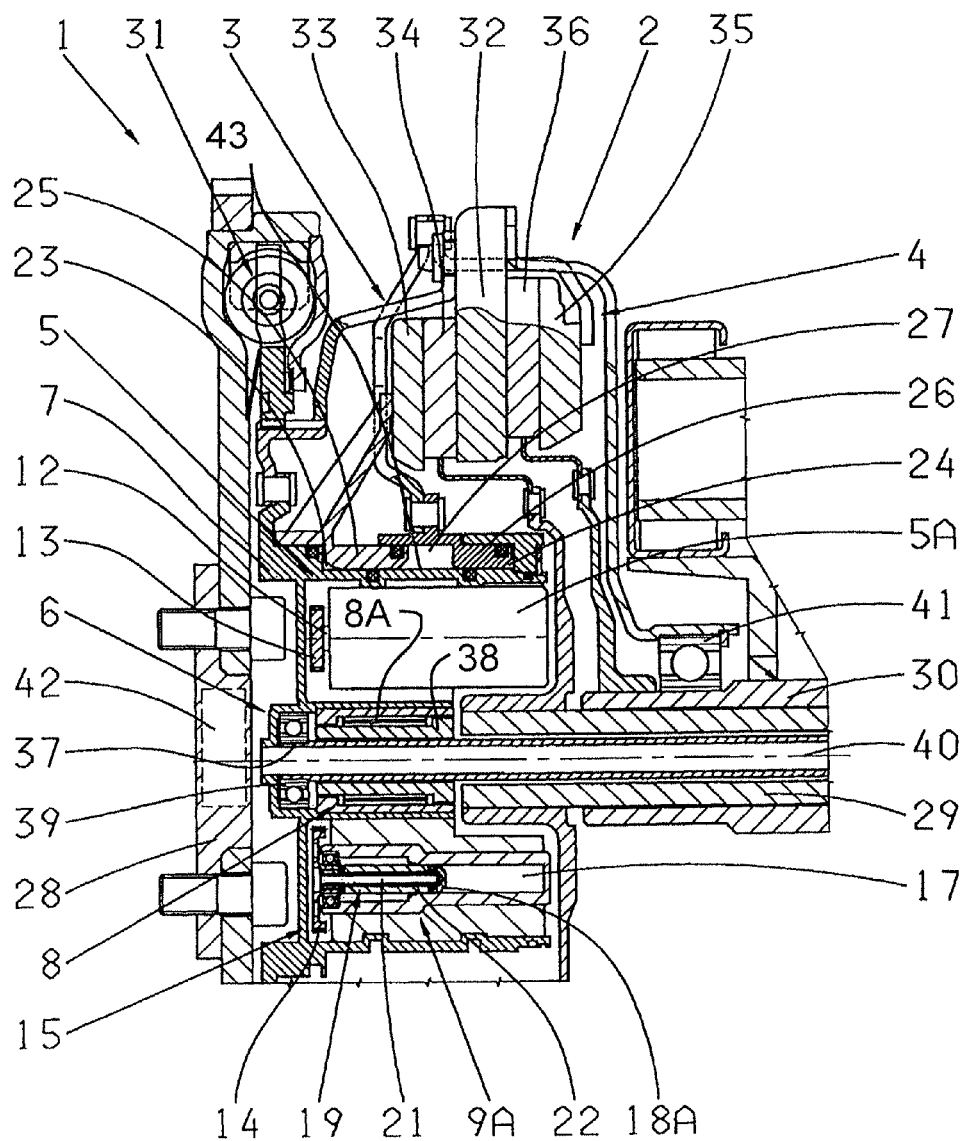
FIG. 1 a partial longitudinal sectional view of a transmission device according to the invention.

FIG. 1 shows a partial longitudinal sectional view of a transmission device 1 in the form of a double clutch transmission comprising a double clutch device 2 disposed on the transmission input side. The double clutch device 2 comprises a first friction-locking shift element 3 and a second friction-locking shift element 4 which can be actuated via an actuator 6 comprising an electrical component 5, in the manner to be described below.

Using the double clutch device 2, a crankshaft 28 of an internal combustion engine of a vehicle drive train (not depicted) can be operatively connected to either a first transmission input shaft 29 or a second transmission input shaft 30 to enable torque from the internal combustion engine to be transmitted from the transmission input in the direction of the transmission output via a first or a second power path of the transmission device 1. A torsional-vibration damping device 31 is provided between the crankshaft 28 and the transmission shaft 7 to reduce rotational irregularities of the internal combustion engine.

In the present case, the electrical component 5 comprises two electric machines 5A, 5B which are connected in a rotationally fixed manner with a transmission shaft 7, rotate during operation at the rotational speed of the transmission shaft 7, and are operatively connected to further components 38 of the transmission device 1 via an electrical transmitting device 8. This means that energy, control signals, and data are transmitted between the further components 38 of the transmission device 1, which are preferably affixed to the housing (also referred to as housing affixed components 38), and the electric machines 5A and 5B connected in a rotationally fixed manner with the transmission shaft 7 via the transmitting device 8 which operates on the basis of induction in the present case. A thermal insulation device 43 is provided at least between the electrical component 5 and the shift element 3, 4 to protect the electrical components 5 of the actuator 6 from a thermal load.

The drive energy required to drive the electric machines 5A and 5B, and the required control signals, i.e. setpoint values and actual values, are exchanged bidirectionally in a contactless manner with housing-affixed components of the transmission device 1 and, preferably, with further rotatable transmission elements of the transmission device 1 via the inductive transmitting device 8.

The transmitting device 8, which is a rotary joint, is disposed in the interior of the double clutch device 2 in the present case, which is favorable in terms of construction space. Moreover, a housing-affixed part 8A of the transmitting device 8 is mounted via an extension element 37 in a housing-affixed component 38, which is supported at the other end via a bearing device 39 in the double clutch device 2. The extension element 37 also comprises a central bore hole 40 through which the electrical connecting lines (not depicted) can be routed between the transmitting device 8 and the electrical system and the control device.

The double clutch device 2 is mounted on the second transmission input shaft 30 via a further bearing device 41 or, in a further embodiment of the transmission device which is not depicted in the drawing, on a component affixed to the housing. In addition, the double clutch device 2 is mounted in the crankshaft 28 using a pilot bearing 42 which is depicted merely schematically in the drawing.

In a further embodiment of the transmission device that is not depicted in the drawing, actuation of the shift elements of the double clutch device is supported by compensating springs, and the shift elements are designed either as dry clutches or oil-cooled clutches. Moreover, it is possible to design the shift elements such that the shift elements are fully disengaged or fully engaged in the pressure-free state, i.e. when the actuating pressure is equal to zero.

According to further embodiments of the transmission device 1, control signals are not transmitted inductively, but rather capacitively, optically, or via other contactless transmission paths between the electrical component of the actuator, which rotates with the transmission shaft 7, and further components of the transmission device 1, which are affixed to the housing and/or rotate at a different speed than the electrical components.

Figure 2:
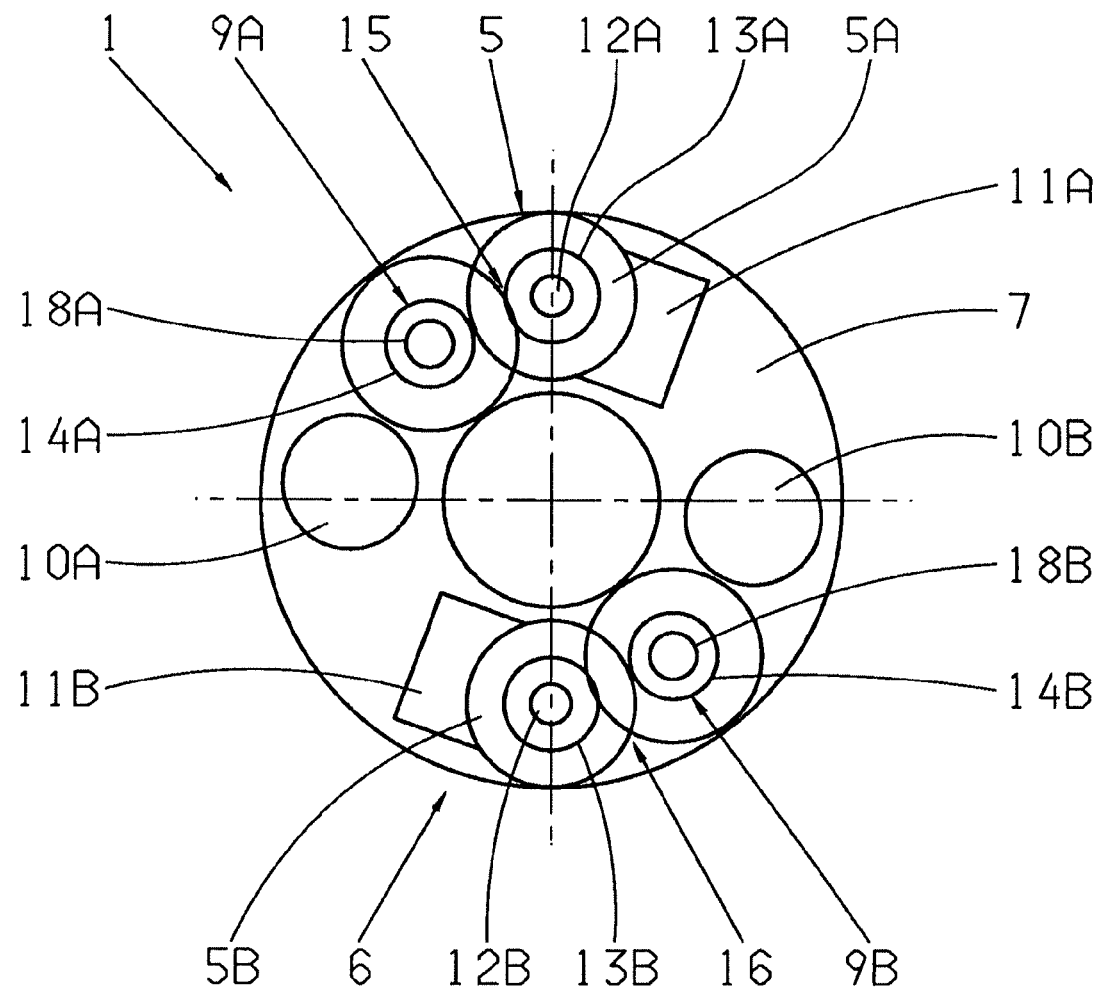
FIG. 2 a highly schematized cross-sectional view of the transmission device according to FIG. 1.

FIG. 2 shows a highly schematized cross-sectional view of the transmission device 1 according to FIG. 1, which mainly shows only the individual components of the actuator 6 in a highly simplified manner. As shown in FIG. 2, the actuator 6 comprises two substantially identical subregions which contain, respectively, the electric machines 5A and 5B and the pump devices 9A, 9B which are likewise connected to the transmission shaft 7 in a rotationally fixed manner. In addition to the electric machines 5A, 5B and the pump devices 9A and 9B, the structurally identical parts of the actuator 6 are equipped with a hydraulic fluid accumulator 10A, 10B, respectively, and electronic modules 11A and 11B which are assigned to the electric machines 5A, 5B, respectively, and are connected to the transmission shaft 7 in a rotationally fixed manner.

In the present case, the actuator 6 is supplied with electric energy from a housing-affixed energy source, i.e. the electrical system of a vehicle, in a contactless manner via the transmitting device 8. In addition, the electronic modules 11A and 11B for actuating the double clutch device 2 depending on the operating state are supplied with the open-loop and closed-loop control data via the electrical transmitting device 8 by a control device which is the transmission control device of the transmission device 1 in the present case, wherein the data exchange can take place bidirectionally, i.e. also starting from the actuator in the direction of the control device.

The electric machines 5A, 5B are operatively connected with the pump devices 9A, 9B via gearwheels 13A, 13B which are connected to motor output shafts 12A, 12B of the electric machines 5A, 5B and mesh with pump gearwheels 14A, 14B, respectively, wherein the gearwheels 13A, 13B and the pump gearwheels 14A and 14B are transmission devices 15, 16, respectively, between the electric machines 5A, 5B and the pump devices 9A, 9B.

The pump devices 9A, 9B comprise a piston element 18A, 18B, respectively, which is axially displaceable in a piston element chamber 17 and can be actuated by drive converter devices 19, which correspond to a drive converter device 19 depicted in greater detail in FIG. 1, to an extent such that actuating pressure for the shift element 3 or the shift element 4 is provided. In the region of one of the drive converter devices 19, the rotational drives of the electric machines 5A and 5B can be converted into translatory drive motion of the piston element 18A or the piston element 18B.

In the present case, the drive converter device 19 is in the form of a spindle-nut system, wherein each of the pump gearwheels 14A, 14B is connected in a rotationally fixed manner to a spindle 21 which is disposed in the interior of the piston elements 18A, 18B and is coaxial therewith. The piston elements 18A and 18B are the nuts of the spindle-nut systems 20 of the pump devices 9A and 9B. A self-inhibiting design of the spindle-nut system makes it possible to hold the friction clutch at a predefined, transmissible torque in a currentless manner.

The drawing only shows the drive converter device 19 spindle 21 of the part of the actuator 6 that includes the electric machine 5A, and so reference will be made mainly to the part of the actuator that includes the drive converter device 19 in the further description of the functionality of the actuator 6.

The spindle 21 of the drive converter device 19 is operatively connected to the piston element 18A by a thread 22 in such a manner that, in a first rotational direction of the rotational drive of the electrical machine 5A, the volume of the piston element chamber 17 is reduced and, in an opposite, second rotational direction of the electric machine 5, the volume of the piston element chamber 17 is increased. In the present case, the piston element chamber 17 of the pump device 9A is connected to a piston pressure space of the first shift element 3 of the double clutch device 2. At the same time, a piston element chamber of the pump device 9B, which is not depicted in greater detail in the drawing, is connected to a piston pressure space 24 of the second shift element 4 to enable the second shift element 4 to be actuated in the same manner as the first shift element 3.

When the piston element chamber 17 of the pump device 9A is reduced, or when the volume of the piston element chamber of the pump device 9B is reduced, the pressure in the piston compression space 23 or 24 of the shift element 3 or 4, respectively, is increased. The transmission capabilities of the shift elements 3 and 4 can therefore be varied in a stepless manner to a desired extent between a fully disengaged operating state, in which essentially no torque can be transmitted via the shift elements 3 and 4, and a fully engaged operating state, in which torque that is present can be transmitted in entirety up to an upper torque limit.

A common pressure compensation space 27 is provided between actuating pistons 25, 26 of the shift elements 3, 4, which, in addition to the piston element chambers 17 of the pump devices 9A, 9B, is connected to the hydraulic fluid accumulators 10A, 10B to easily prevent a pressure increase resulting from leakage currents originating in the piston compression spaces 23 and 24 in the direction of the pressure compensation space 27, which would impair the mode of operation of the shift element 3 or the shift element 4.

The double clutch device 2 is equipped with a central plate 32 which is a stop element for the first shift element 3 and for the second shift element 4. The actuating piston 25 of the first shift element 3 is operatively connected to a pressure application plate 33 of the first shift element 3 and, when pressure is applied in the piston compression space 23, presses a lining disk 34 of the first shift element, which is disposed between the pressure application plate 33 and the central plate 32, against the central plate 32 to adjust the transmission capability of the first shift element 33 depending on the particular operating state of the transmission device 1 and a related default setting on the control device side.

Upon application of actuating pressure in the piston pressure space 24 of the second shift element 4, the actuating piston 26 of the second shift element 4 applies a corresponding contact pressure on a pressure application plate which presses a lining disk 36 of the second shift element 4, which is disposed between the central plate 32 and the pressure application plate 35, against the central plate 32 to provide the shift element 4 with the particular transmission capability that is required.

Both the first shift element 3 and the second shift element 4 are operated in a controlled manner depending on the actuating force that is present, or depending on an equivalent operating variable, wherein a force sensor or a pressure sensor is provided in the actuation chain of the actuator 6 to determine the amount of actuating force that is present.

The piston element chambers 17 of the pump devices 9A and 9B of the actuator 6 are connected to the assigned hydraulic fluid accumulators 10A and 10B, respectively, in such a manner that, in the pressure-free operating state of the piston element chambers 17, hydraulic fluid can flow out of the hydraulic fluid accumulators 10A, 10B into the piston actuating spaces 17.

The transmission device according to the invention is based on the advantage that energy can be transmitted from housing-affixed components to rotating components in a manner that is substantially free of drag torque and wear. Furthermore, the transmission device according to the invention has a compact design since the actuator provided for actuating the shift element is integrated in the shift element itself or in the transmission shaft on which the shift element is disposed. This embodiment makes it possible to design the shift element free of axial forces toward the outside.

In addition, the transmission device according to the invention, which is favorable in terms of construction space and is structurally simple, can be operated with greater efficiency compared to transmission devices known from practical application. This is due, inter alia, to the fact that energy is supplied to the actuator only during actuation of the shift element or actuation of the shift elements. Practically no energy is required to maintain transmission capability of the shift element or the shift elements, which is set via the actuator, since the hydraulic actuation path of the actuator is a closed system which only requires energy-efficient, "on demand" energy consumption during operation.

REFERENCE CHARACTERS 1 transmission device
2 double clutch device
3 first friction-locking shift element
4 second friction-locking shift element
5 electrical component of the actuator
5A, 5B electric machine
6 actuator
7 transmission shaft
8 electrical transmitting device
8A housing-affixed part of the transmitting device
9A, B pump device
10A, B hydraulic fluid accumulator
11A, B electronic module
12A, B motor output shaft of the electric machine
13A, B gearwheel
14A, B pump gearwheel 15, 16 transmission device
17 piston element chamber
18A, B piston element
19 drive converter device, spindle-nut system
21 spindle
22 thread
23, 24 piston pressure space
25, 26 actuating piston
27 pressure compensation space
28 crankshaft
29 first transmission input shaft
30 second transmission input shaft
31 torsional-vibration damping device
32 central plate
33 pressure application plate of the first shift element
34 lining disk of the first shift element
35 pressure application plate of the second shift element
36 lining disk of the second shift element
37 extension element
38 housing-affixed component
39 bearing device
40 central bore hole
41 further bearing device
42 pilot bearing

The invention claimed is:

1. A transmission device (1) comprising:
   at least one shift element (3, 4) being actuatable via an actuator (6) comprising at least one electrical component (5), the electrical component (5) being connected to a transmission shaft (7) and being operatively connected to at least one further component of the transmission device (1) via an electrical transmitting device (8);
   the electrical component (5) and a pump device (9A, 9B) connected to the transmission shaft (7) both rotating during operation around the transmission shaft (7) at a rotational speed of the transmission shaft (7);
   a hydraulic actuating pressure, for actuating the shift element (3, 4), being generated via the electrical component (5);
   electrical energy being inductively exchanged between the at least one further component of the transmission device (1) and the at least one electrical component (5) connected to the transmission shaft (7);
   the electrical component (5) comprising an electric machine (5A, 5B) which drives the pump device (9A, 9B); and
   the actuator (6) comprising a hydraulic fluid accumulator (10A, 10B) being operatively connectable to a pressure compensation space (27) of the shift element (3, 4).

2. The transmission device according to claim 1, wherein the at least one further component of the transmission device (1) is affixed to a housing of the transmission device.

3. The transmission device according to claim 1, wherein the pump device (9A, 9B) is connected to the electric machine (5A, 5B) via another transmission device (15, 16).

4. The transmission device according to claim 1, wherein the pump device (9A, 9B) comprises at least one piston element (18A, 18B) which is axially displaceable in a piston element space (17) and is actuatable by a drive converter device (19), in a region of which rotational drive of the electric machine (5A, 5B) is converted into translatory drive motion of the piston element (18A, 18B), to an extent such that the actuating pressure for the shift element (3, 4) is provided.

5. The transmission device according to claim 4, wherein the drive converter device (19) is a spindle-nut system.

6. The transmission device according to claim 1, wherein a piston compression chamber (23, 24) of the shift element (3, 4) is acted upon with the actuating pressure.

7. The transmission device according to claim 4, wherein the hydraulic fluid accumulator (10A, 10B) is operatively connectable to the piston element chamber (17) at least nearly in a pressure-free operating state of the piston element chamber (17).

8. The transmission device according to claim 1, wherein the pressure compensation space (10A, 10B) is assigned to a further shift element (3, 4).

9. The transmission device according to claim 1, wherein the actuator is equipped with at least one of a force sensor and a pressure sensor.

10. The transmission device according to claim 1, wherein the transmitting device (8) is disposed in an interior of the shift element (3, 4).

11. The transmission device according to claim 1, wherein transmission of control data between the at least one further component and the electrical component (5) takes place at least one of inductively, capacitively and optically.

12. The transmission device according to claim 1, wherein a thermal insulation device is provided at least between the electrical component and the shift element.

13. A transmission device (1) comprising:
   at least one shift element (3, 4) being actuatable via an actuator (6) comprising at least one electrical component (5), the electrical component (5) being connected to a transmission shaft (7), rotating during operation at a rotational speed of the transmission shaft (7) and being operatively connected to at least one further component of the transmission device (1) via an electrical transmitting device (8);
   a hydraulic actuating pressure, for actuating the shift element (3, 4), being generated via the electrical component (5);
   electrical energy being inductively exchanged between the at least one further component of the transmission device (1) and the at least one electrical component (5) connected to the transmission shaft (7);
   the electrical component (5) comprising an electric machine (5A, 5B) which drives a pump device (9A, 9B);
   the actuator (6) comprising a hydraulic fluid accumulator (10A, 10B) being operatively connectable to a pressure compensation space (27) of the shift element (3, 4); and
   the actuator (6) comprising a hydraulic fluid accumulator (10A, 10B) which can be operatively connected to the piston element chamber (17) in a substantially pressure-free operating state of the piston element chamber (17).

14. An automotive transmission device (1) comprising:
   at least one shift element (3, 4), being actuatable via an actuator (6);
   the actuator (6) comprising at least one electrical component (5),
   the electrical component (5) being connected to a transmission shaft (7), rotating during operation at a rotational speed of the transmission shaft (7), and being operatively connected to at least one further component of the transmission device (1) via an electrical transmitting device (8);
   the transmission shaft (7) being coaxial with a crankshaft (28);
   a hydraulic actuating pressure, for actuating the shift element (3, 4), being generated via the electrical component (5);
   electrical energy being inductively exchanged between the at least one further component of the transmission device (1) and the at least one electrical component (5) connected to the transmission shaft (7);

the electrical component (5) comprising an electric machine (5A, 5B) which drives a pump device (9A, 9B); and the actuator (6) comprising a hydraulic fluid accumulator (10A, 10B) being operatively connectable to a pressure compensation space (27) of the shift element (3, 4).

15. The transmission device according to claim 14, wherein the transmission shaft (7) is coaxial with first and second transmission input shafts (29, 30).

16. The transmission device according to claim 14, wherein the transmission shaft (7) carries torque from a crankshaft (28) of an internal combustion engine of a vehicle drive train to one of a first and a second transmission input shaft (29, 30).

17. The transmission device according to claim 14, wherein during operation, the transmission shaft (7) rotates at substantially the same speed as a crankshaft (28).

18. The transmission device according to claim 14, wherein during operation, a rotation speed of the transmission shaft (7) varies with respect to a rotation speed of a first transmission input shaft (29) based on an actuation of the at least one shift element (3).

19. The transmission device according to claim 14, wherein the electric machine (5A, 5B) is connected in a rotationally fixed manner to the transmission shaft (7) and during operation the entire electric machine (5A, 5B) rotates around a central bore hole (40) in the transmission shaft (7).

20. The transmission device according to claim 14, wherein the entire electric machine (5A, 5B) is located within an exterior circumference of the transmission shaft (7), and the electrical component (5), the pump device (9A, 9B), and the hydraulic fluid accumulator (10A, 10B) are all connected to the transmission shaft (7) and all rotate during operation around the transmission shaft (7) at the rotational speed of the transmission shaft (7).

* * * * *